(12) United States Patent
Bausch et al.

(10) Patent No.: US 9,335,164 B2
(45) Date of Patent: May 10, 2016

(54) DEVICE FOR THICKNESS MEASUREMENT AND METHOD THEREFOR

(75) Inventors: Jörg Bausch, Düsseldorf (DE); Josef Karduck, Düsseldorf (DE); Andreas Runge, Remscheid (DE); Johannes Schwedmann, Duisburg (DE); Jochen Wans, Meerbusch (DE); Karl-Heinz Spitzer, Clausthal-Zellerfeld (DE); Hellfried Eichholz, Ilsede (DE)

(73) Assignee: SMS GROUP GMBH, Düsseldorf (DE)

( * ) Notice: Subject to any disclaimer, the term of this patent is extended or adjusted under 35 U.S.C. 154(b) by 754 days.

(21) Appl. No.: 12/449,952

(22) PCT Filed: Mar. 10, 2008

(86) PCT No.: PCT/EP2008/001902
§ 371 (c)(1),
(2), (4) Date: Nov. 9, 2009

(87) PCT Pub. No.: WO2008/110330
PCT Pub. Date: Sep. 18, 2008

(65) Prior Publication Data
US 2012/0285653 A1    Nov. 15, 2012

(30) Foreign Application Priority Data

Mar. 9, 2007   (DE) .......................... 10 2007 011 690
Mar. 6, 2008   (DE) .......................... 10 2008 012 975

(51) Int. Cl.
*B22D 11/06*    (2006.01)
*B22D 11/18*    (2006.01)
(Continued)

(52) U.S. Cl.
CPC .............. *G01B 21/08* (2013.01); *B22D 11/064* (2013.01); *B22D 11/0631* (2013.01); *B22D 11/18* (2013.01)

(58) Field of Classification Search
CPC .... B22D 2/00; B22D 11/0631; B22D 11/064; B22D 11/18; G01B 21/08
USPC ............................... 164/453, 479, 151.2, 429
See application file for complete search history.

(56) References Cited

U.S. PATENT DOCUMENTS

| 4,335,609 | A | | 6/1982 | Saulsbury |
| 4,676,298 | A | * | 6/1987 | Liebermann .................. 164/463 |
| 5,036,901 | A | * | 8/1991 | Williams et al. .............. 164/452 |

(Continued)

FOREIGN PATENT DOCUMENTS

| CN | 1301203 | 6/2001 |
| CN | 1347779 | 5/2002 |

(Continued)

*Primary Examiner* — Kevin P Kerns
(74) *Attorney, Agent, or Firm* — Lucas & Mercanti, LLP; Klaus P. Stoffel

(57) ABSTRACT

A device and a method for measuring thickness in horizontal strip casting installations for casting strip or sections. A measuring device measures the thickness of the liquid or pasty melt in the mold. The measuring device operates without contact by a laser and an optical sensor that are arranged so that the surface of the liquid or pasty melt is monitored, whereby the thickness distribution over an entire width of the melt is measured. A measuring signal is generated, and a control signal is generated based on the measuring signal in order to control a device for distributing the melt.

5 Claims, 3 Drawing Sheets

(51) Int. Cl.
  *B22D 2/00* (2006.01)
  *G01B 21/08* (2006.01)

(56) References Cited

U.S. PATENT DOCUMENTS

| | | | |
|---|---|---|---|
| 5,355,937 A * | 10/1994 | Mueller et al. | 164/479 |
| 5,381,856 A * | 1/1995 | Fujikura et al. | 164/463 |
| 5,402,364 A | 3/1995 | Kitoh et al. | |
| 6,357,637 B1 | 3/2002 | Urlau et al. | |
| 6,363,997 B1 * | 4/2002 | Urlau | 164/453 |
| 6,446,703 B1 * | 9/2002 | Roder et al. | 164/455 |
| 6,575,225 B1 * | 6/2003 | Hohenbichler et al. | 164/480 |

FOREIGN PATENT DOCUMENTS

| | | |
|---|---|---|
| CN | 1377747 | 11/2002 |
| DE | 196 18 923 | 12/1996 |
| DE | 197 46 728 | 10/1998 |
| DE | 197 58 108 | 1/1999 |
| EP | 0 334 802 | 9/1989 |
| EP | 1 047 510 | 4/2002 |
| JP | 58023550 | 2/1983 |
| JP | 58065548 | 4/1983 |
| JP | 61137658 | 6/1986 |
| JP | 63278654 | 11/1988 |
| JP | 2001519243 | 10/2001 |
| RU | 2191348 | 10/2002 |
| SU | 1789851 | 1/1993 |

* cited by examiner

DEVICE FOR THICKNESS MEASUREMENT AND METHOD THEREFOR

TECHNICAL FIELD

The invention concerns a device for measuring thickness by means of a measuring device and a method for carrying out a measurement by means of a measuring device, with which especially the thickness of a melt in a metal casting installation can be measured.

PRIOR ART

In the casting of strip or sections made of metals or metal alloys, especially by the horizontal strip casting process, the hot melt, especially a metal or steel melt, runs out of a vessel onto a traveling mold. In this system, the casting width is guaranteed by the arrangement of side walls, which may be stationary or may be displaceable or adjustable to be able to ensure different strip widths during the casting process.

In this process for producing especially strip or sections, the upper surface of the melt is not in contact with a mold wall, so that the surface is exposed to the air or to a systematically adjustable atmosphere.

In a process of this type, the thickness of the melt thus is not limited by a mold wall but rather can be adjusted by the mass flow from a feed system and can vary over the length and/or the width, so that wedge-shaped irregularities can develop in the width direction or wave-shaped irregularities can develop in the longitudinal direction.

This process for casting, for example, strip or sections is also known as direct strip casting (DSC) and is known from the prior art, for example, from DE 197 58 108 C1, EP 1 047 510 B1, or DE 197 46 728 C1.

In this regard, EP 1 047 510 B1 discloses a method for the continuous production of hot-rolled flat products from thin cast strip, in which the thin cast strip is cooled in a controlled way under a protective gas atmosphere, and the melt is conveyed on a traveling mold, starting from the vessel that contains the melt.

The traveling mold is followed by rolls of a rolling train for further processing of the cast metal strip or the cast melt and providing it with the desired dimensions and material properties. For the rolls to be able to produce a homogeneous cast product, it is necessary, therefore, for the thickness of the cast metal strip or cast melt to be as homogeneous as possible. However, it has been found that this cannot be realized to a sufficient extent in the prior-art installations.

DESCRIPTION OF THE INVENTION, STATEMENT OF THE PROBLEM, SOLUTION, ADVANTAGES

The objective of the invention is to create a device, a use of a device and a method for carrying out a measurement by means of a measuring device, especially for measuring the thickness of a melt in a metal casting installation, which make it possible to produce rolled products or strip or sections with dimensions and material properties that are as homogeneous as possible.

In accordance with the invention, the objective is achieved with a device for measuring a thickness, especially for use in casting installations for casting strip or sections, with at least one measuring device, such that the thickness of a liquid or pasty melt or of a solidified cast product is measured in a mold or in a vessel. In this regard, it is especially advantageous if the moving melt or cast product is monitored and its thickness determined. The determination of the thickness distribution across the width makes it possible to determine a profile of the melt, and in the case of a nonoptimal surface structure or inclination, open-loop or closed-loop control actions can be taken to counteract this problem.

The term metal in the context of the present invention includes metal alloys.

It is advantageous if the measuring device operates without contact and monitors or determines the surface. In this regard, it is advantageous if the measuring device operates by means of a laser and an optical sensor. It is advantageous if a laser for scanning the surface and a corresponding sensor are provided, or a plurality of lasers and/or sensors can be provided, each of which detects or scans a particular region of the surface.

It can also be advantageous for the measuring device to operate with contact. In this case, it is effective if the measuring device operates by means of a tactile sensor, such as a probe.

It is also advantageous if a control signal is generated on the basis of a measuring signal of the sensor in order to control the mass flow of a melt from a vessel that contains the melt. This makes it possible to control the thickness of the melt or of the cast product by means of the mass flow.

Furthermore, it is advantageous if a control signal is generated on the basis of a measuring signal in order to control a device for distributing the melt. This makes it possible to control the surface by means of the material distribution.

It is also advantageous if the thickness of the melt in the vessel is measured in a filling zone and/or in a feeding zone to the mold. This measurement makes it possible to control the flow of the melt to the vessel in an advantageous way.

The objective with respect to the method is achieved by which a method for measuring a thickness, especially for use in casting installations for casting strip or sections, with a measuring device, such that the thickness of a liquid or pasty melt or of a solidified cast product is measured in a mold.

In this regard, it is effective if the measuring device operates without contact or with contact. It is also effective if a control signal is generated on the basis of a measuring signal of the measuring device in order to control the mass flow of a melt from a vessel that contains a melt.

It is also advantageous if a control signal is generated on the basis of a measuring signal of the measuring device in order to control a device for distributing the melt.

It is especially effective if the thickness distribution over the width of the melt or the cast product is measured. This makes it possible to determine a profile of the melt, and to use this profile to take open-loop or closed-loop control actions to counteract irregularities in the thickness distribution. In this regard, it is especially advantageous if the result or the signals of the thickness measurement distributed over the width are used to control a mass flow and/or an orientation of a mold to at least counteract a thickness taper and/or waviness of a cast product.

BRIEF DESCRIPTION OF THE DRAWINGS

The invention is explained in greater detail below on the basis of the specific embodiment illustrated in the drawings.

PREFERRED EMBODIMENT OF THE INVENTION

Figure 1:
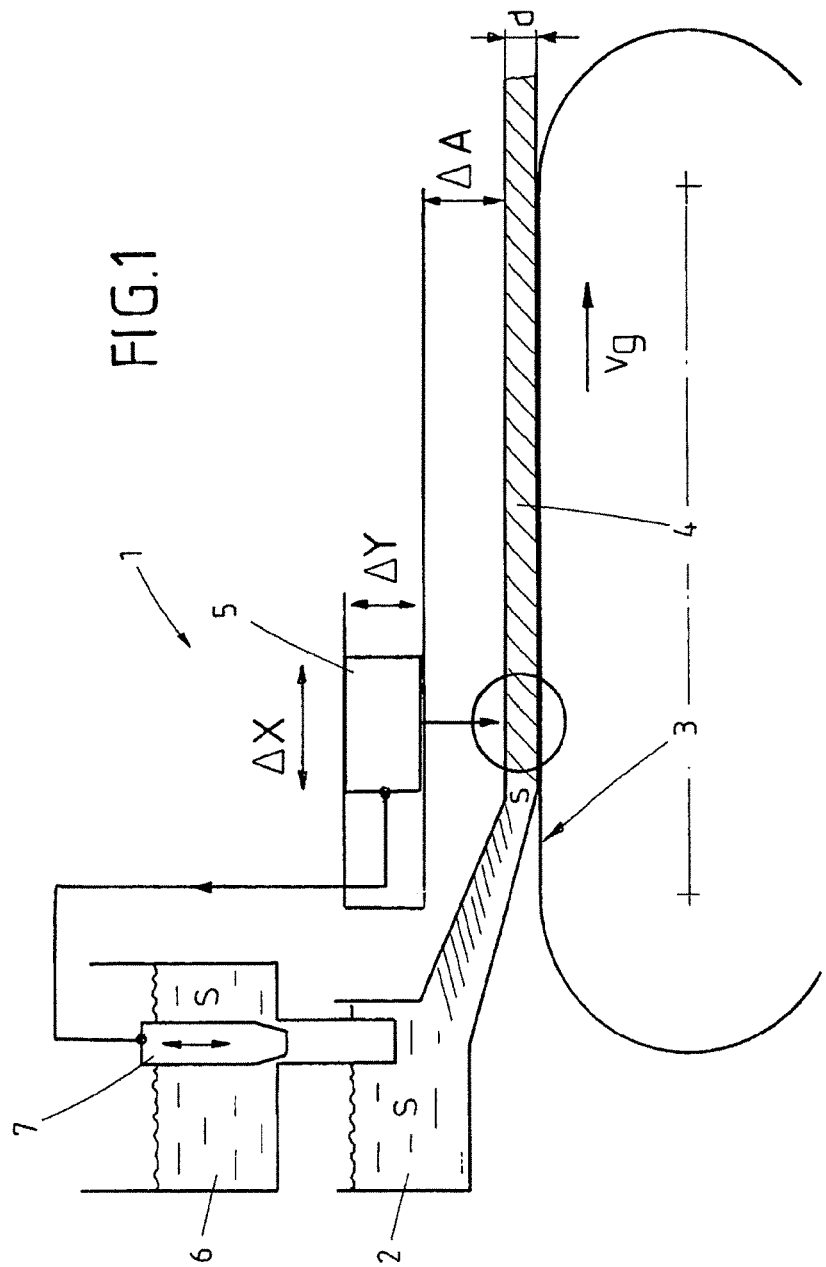
FIG. 1 is a schematic drawing of a metal casting installation.

FIG. 1 is a schematic drawing of a metal casting installation 1 with a vessel 2, in which liquid metal, for example, a steel melt S, is made available. For this purpose, it is advantageous for the vessel 2 to have heating elements (not shown) for bringing the liquid metal to the desired temperature and/or maintaining it at the desired temperature.

It is advantageous for the liquid metal or melt S to be discharged from the vessel 2 onto the traveling, mobile mold 3, and the traveling of the mold 3 results in the production of a strip 4 from the liquid metal before it is further processed in the downstream stages (not shown) of a rolling mill. As an additional downstream stage, it is also possible to provide, for example, a plate mill in addition to the rolling mill. In this case, the cast strip, as a semifinished product, would constitute an intermediate product.

To measure the thickness of the metal strip 4, a measuring device 5 is provided, which scans the surface of the metal strip without contact or with contact and in this way determines the thickness of the metal strip 4.

The measuring device 5 carries out a determination of the thickness d of the metal strip 4, so that open-loop or closed-loop control of the mass flow of the melt out of the vessel 2 onto the mold 3 can be undertaken by the control unit. It is advantageous for the control unit to be integrated in the measuring device 5, or it can be provided as a separate unit.

The mass flow out of the vessel 2 onto the mold 3 is indirectly controlled by the mass flow out of the reservoir 6 and into the vessel 2. The reservoir 6 also contains a hot melt S, which can flow off into the vessel 2 through an outlet. Systematic movement or control of a closure 7, such as a drain plug or the like, makes it possible to control the draining of the melt out of the reservoir 6 as inflow into the vessel 2. For example, the size of a free gap that allows the melt S to flow out of the reservoir 6 can be adjusted by the height of the drain plug in FIG. 1. To this end, the measuring device 5 can thus relay a control signal to an actuating unit, which controls the inflow of melt S into the vessel 2.

In accordance with the invention, the cast section can thus be controlled over the length and width via the controlled mass flow by the measurement of the thickness of the metal strip or melt 4 across its width, where the fact that the thickness of the metal strip or melt S has been measured is advantageous for the subsequent inline or offline rolling.

It is especially advantageous if the data are available on the thickness of the melt in the initial section of the metal strip as viewed over the width of the metal strip.

Especially advantageous for the application of the invention is the measurement of the melt or the metal strip at the beginning of the metal strip, essentially at the beginning of the mold or after the melt, which is flowing out of the vessel 2 onto the traveling mold, has become uniformly distributed in an advantageous way. This means that the site of the measurement is more or less sufficiently far from the discharge onto the mold that the metal flowing out onto the mold has become or should have become uniformly distributed.

With respect to how the measurement is carried out, it is basically possible to distinguish between measurement methods that work without contact and those that work with contact. The measuring methods that work without contact have the advantage that they can be carried out, for example, with some separation of the measuring device from the melt or the metal strip, so that the measuring device 5 can be arranged in a protected way. Examples of advantageous measuring methods that work without contact are laser measuring methods or, in general, other contactless measuring methods that work on an electromagnetic or optical basis.

In this connection, the measuring device M, 5 can be displaced by $\Delta x$ and $\Delta y$, and it is also possible to adjust the distance $\Delta A$ from the melt S itself. This makes it possible to adjust the measuring device to adapt it to different thicknesses and to position it in a way that protects it from environmental effects.

Figure 2:
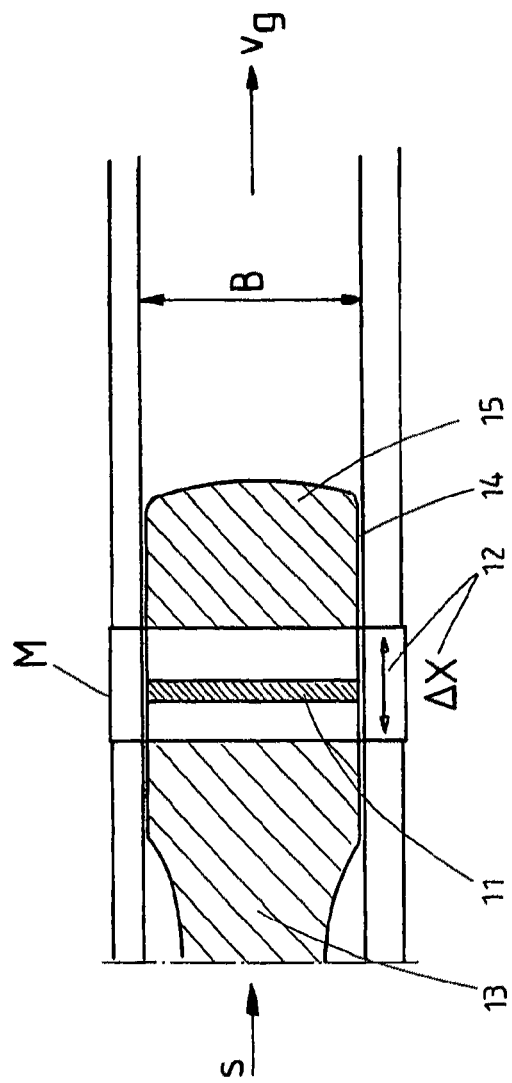
FIG. 2 is a top view of a segment according to FIG. 1.

FIG. 2 is a schematic top view of a point of measurement that is being measured by means of a measuring device M, 5 that operates without contact. In this regard, 11 represents the measuring range of a contactless sensor of the measuring device, for example, a laser with associated optics. The measuring window 11 can be shifted within the range ($\Delta x$) 12. The melt (S), 13 hits the traveling mold 14 and forms a strip 15 of liquid metal or melt of width B. The arrows show the direction of the melt and the mold that is traveling with it, where $v_g$ is the velocity of the traveling mold.

A device that contains a laser as the contactless device is advantageous as the measuring device 5. It can be advantageous, for example, to use a laser that emits red light or a laser that emits blue light. In this regard, the laser emits the light in the region of the measuring window, and due to reflection, the reflected light can be measured by means of a detector, so that the height of the melt across the width of the strip can be detected from the light that is received. It is advantageous if the laser can be controlled in such a way that it scans the width of the strip.

As an alternative to scanning the width of the melt or of the strip or cast product by means of a laser and an associated sensor, it is also possible to arrange several lasers and/or sensors side by side or parallel to one another, each of which then monitors a portion of the width of the melt or cast product, so that a thickness profile can be determined on the basis of the data obtained from the individual lasers and associated sensors.

It is also possible for several sensors to be arranged distributed over the width of the region to be monitored, so that, for example, several sensors are arranged parallel to one another or side by side, which, distributed parallel over the width, detect the thickness of the strip or melt to be monitored. This makes it possible to determine a thickness profile by the scanning or measurement of the thickness distributed over the width of the strip or the melt.

It is especially advantageous for the sensors to be located in a region between a position close to the melt feeding point and a position that corresponds approximately to the point at which the conveyor belt is left. This region has the advantage that the melt is still liquid or at least pasty, and by all means it is also possible to determine a pasty mixed form of melt and solidified material, such as steel. In another embodiment of the invention, it is also effective to determine the thickness of the solidified steel over the width.

Thickness measurement distributed over the width of a melt is especially advantageous, and in this case, it is advantageous for the melt to be moved, for example, in a horizontal mold, for example, in the case of near net shape casting. It is advantageous for the measurement to be carried out while the melt is still liquid, ideally, as close as possible to the inlet, and it is advantageous for the measurement to be carried out distributed over the width. This makes it possible to detect possible thickness taper or waviness of a slab or cast product as early as possible, which, compared to detection only later, when a solidified state has been reached, can have the overall result of a reduction of scrap.

If, for example, a thickness taper is detected, it can be eliminated altogether or at least reduced by systematically controlling the inclination of the mold. In addition, if several nozzles are provided at the outlet of a vessel, the flow of the melt into the mold can be controlled over the width to reduce thickness taper or waviness of the melt.

If waviness of the melt is detected, it is possible, for example, to automatically control the mass inflow. For this purpose, the mass inflow can be automatically controlled, for example, by means of a plug.

The measuring device 5 can be advantageously arranged in such a way that it is located a sufficient distance from the strip of melt, so that the measuring device is not damaged by heat and/or contaminants. It is also possible, for example, to shield the device from water, steel spatters, gas and/or heat. The thickness can also be measured, for example, in an environment that is protected or has been rendered inert, so that the surface of the melt or strip does not oscillate or oscillate strongly in order to prevent or reduce distortion of measurement results.

In accordance with the invention, it is thus advantageous if the measuring device 5 is mounted in a housing that provides protection and/or shielding. In addition, it is advantageous if the housing is mounted in a way that allows it to move, so that positioning of the housing can be carried out, for example, as a function of the casting speed and/or the dimensions of the strip of melt.

In accordance with another idea of the invention, the measuring device 5 can also operate with a sensor system that works with contact instead of a sensor system that works without contact. In this connection, it is possible to provide for the use of a tactile level detector as a probe, which is in contact with the surface of the melt S of the strip 4. The probe, which can also be designed to be wear-resistant, can be brought into contact with the melt permanently or intermittently, for example, at periodic intervals. The thickness of the melt can be detected by the contact with the surface of the melt. The thickness of the melt can also be detected in the direction of the width, to which end, for example, a method can be carried out in the width direction. It is also possible to arrange several tactile sensors or detecting elements side by side to be able to detect or generate a thickness profile over the width of the strip.

In addition, it can also be effective if the sensor or sensors are arranged or designed in such a way that a differential measurement can be carried out. For example, in one type of differential measurement, a zero point or reference point between the sensor and the surface of the conveyor belt is present or is detected in the absence of a melt, and after the melt has been supplied, a reduced path or a reduced distance between the sensor and the measuring point can be detected. The difference in the length of the path or the reduced distance between the sensor and the measuring point that is then detected would correspond to the thickness of the melt or of the cast strip or product.

The thickness can also be measured by penetration of the melt or cast product with radiation. In this method, for example, it is possible to make a thickness determination between a state without melt/cast product and a state with melt/cast product from transit time differences between the signal emitted by the sensor and the reflected signal.

If the thickness of the melt S is determined in a well-defined position essentially directly after a distribution of the melt on the traveling mold, a control signal can be generated to control the mass flow from the vessel 2 to the mold 3. The reason this is advantageous is that it makes it possible to achieve a tolerance of the thickness of the melt over the width and/or over the length within a predeterminable percentage or range.

In addition, a casting installation of this type can be expanded by a device for the active distribution of the melt on the traveling mold. In this regard, it is possible to provide mechanical or electromagnetic melt distributors on a feed nozzle with segmented control or action over the width or pneumatic or vacuum devices and/or manipulators that uniformly distribute the melt on the mold.

The measurement of the thickness of the melt makes it possible not only to control the mass flow but also, if necessary, to control, by means of a suitable control signal, a device for evening out the melt and/or a manipulator, such as a stirrer or vacuum distributor.

When laser measuring processes or methods are used, the lasers used for this purpose, also known as line lasers, can produce a line transversely to the casting direction at a predeterminable angle on the melt film or on the surface of the melt or cast product. The measurement of the thickness of the melt or of the cast product or its profile, such as edge elevation, can be suitably carried out by means of video image processing at an angle. This type of method is also known as the light-section process. It is suitable to use either one laser or several lasers distributed over the width of the strand.

It is also possible for the laser to be arranged in such a way that it strikes the surface of the melt or the cast product from above, including, for example, essentially vertically. In this regard, the thickness of the melt or cast product can then be determined by the transit time difference of the reflected light compared to a reference value.

Figure 3:
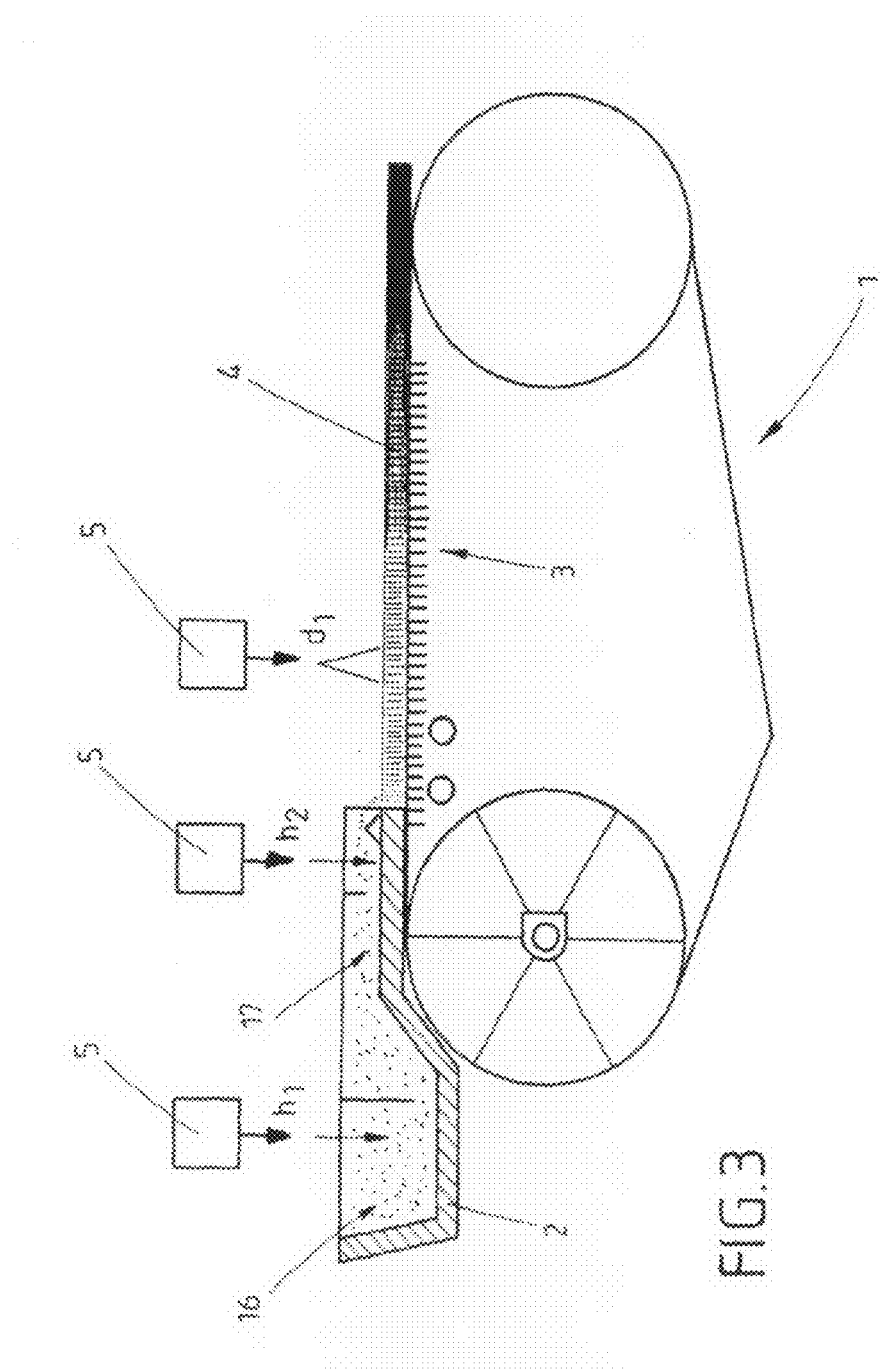
FIG. 3 is a view of a device of the invention.

FIG. 3 shows a device for measuring the thickness of a melt in a vessel 2, where the melt is fed into the vessel 2 from a reservoir (not shown in FIG. 3). To measure the thickness of the melt, measuring devices 5 are provided, which can measure the thickness of the melt in the mold 3 or in the vessel 2. In this regard, there are two positions in the vessel 2 that are advantageous, namely, the filling zone 16, in which the vessel 2 is filled with the melt from a reservoir or tundish, and the feeding zone 17, in which the melt is fed to the mold 3 with a predetermined thickness onto the running belt. The feeding zone 17 is thus situated toward the end of the vessel 2 in the direction of the running belt. The thickness d1 on the mold and h1 and h2 in the vessel 2 in the filling zone 16 and in the feeding zone 17 can thus be measured. The measurement can thus be made in the zone of standing melt or in the zone of moving melt.

LIST OF REFERENCE NUMBERS 1 metal casting installation
2 vessel
3 mold
4 strip
5 measuring device
6 reservoir
7 closure
11 measuring range
12 range
13 melt
14 mold
15 strip
16 filling zone
17 feeding zone

The invention claimed is:

1. A device for measuring thickness in horizontal strip casting installations for casting strip or sections, the device comprising: a measuring device (5), where a liquid or pasty metal or steel melt enters a traveling mold (3) from a vessel (2), the vessel (2) receiving the melt from a reservoir (6), and the thickness of the liquid or pasty melt (13) is measured in the mold (3), wherein the measuring device (5) operates without contact by a laser and an optical sensor that are arranged so that the surface of the liquid or pasty melt (13) is monitored, whereby the thickness distribution over an entire width of the melt is measured, a measuring signal is generated based only on the measured thickness, and a control signal is generated based on the measuring signal in order to control a device for distributing the melt so that a mass flow of the melt from the vessel to the mold is exclusively controlled by controlling the mass flow of the melt from the reservoir to the vessel to counteract a thickness taper and waviness of the strip while the melt is monitored, wherein the mold is oriented based on the measured thickness distribution so as to counteract the thickness taper and waviness of the strip.

2. A device in accordance with claim 1, wherein a control signal is generated based on a measuring signal in order to control the mass flow of a melt (13) from a vessel that contains the melt (13).

3. A device in accordance with claim 1, wherein the thickness of the melt (13) in the vessel (2) is measured in a filling zone and/or in a feeding zone to the mold (3).

4. A method for measuring thickness in horizontal strip casting installations (1) for casting strip or sections, where a liquid or pasty metal or steel melt enters a traveling mold (3) from a vessel (2), the vessel (2) receiving the melt from a reservoir (6), the method comprising: measuring thickness of the liquid or pasty melt (13) in the mold (3) with a non-contact measuring device (5) having a laser and an optical sensor arranged to monitor the surface of the liquid or pasty melt (13) whereby the thickness distribution over an entire width of the melt is measured; generating a measuring signal based only on the measured thickness; generating a control signal based on the measuring signal for controlling a device for distributing the melt so that a mass flow of the melt from the vessel to the mold is exclusively controlled by controlling the mass flow of the melt from the reservoir to the vessel to counteract a thickness taper and waviness of the strip while the melt is monitored; and controlling orientation of the mold based on the measured thickness distribution to counteract the thickness taper and waviness of the strip.

5. A method in accordance with claim 4, further including using the signals of the thickness measurement distributed over the width to control a mass flow and/or an orientation of a mold (3) to at least counteract a thickness taper and/or waviness of a melt (13).

\* \* \* \* \*